US012777498B2

(12) United States Patent
Sun et al.

(10) Patent No.: US 12,777,498 B2
(45) Date of Patent: Oct. 27, 2026

(54) INDICATION OF PHASE TRACKING REFERENCE SIGNAL (PTRS) PORTS ASSOCIATION WITH DEMODULATION REFERENCE SIGNAL (DMRS) PORTS

(71) Applicant: Apple Inc., Cupertino, CA (US)

(72) Inventors: Haitong Sun, Cupertino, CA (US); Sigen Ye, San Diego, CA (US); Chunxuan Ye, San Diego, CA (US); Huaning Niu, San Jose, CA (US); Seyed Ali Akbar Fakoorian, San Diego, CA (US); Hong He, San Jose, CA (US); Dawei Zhang, Saratoga, CA (US); Wei Zeng, Saratoga, CA (US); Oghenekome Oteri, San Diego, CA (US)

(73) Assignee: Apple Inc., Cupertino, CA (US)

( * ) Notice: Subject to any disclaimer, the term of this patent is extended or adjusted under 35 U.S.C. 154(b) by 475 days.

(21) Appl. No.: 18/362,020

(22) Filed: Jul. 31, 2023

(65) Prior Publication Data

US 2024/0057116 A1 Feb. 15, 2024

Related U.S. Application Data

(60) Provisional application No. 63/396,781, filed on Aug. 10, 2022.

(51) Int. Cl.
*H04W 72/23* (2023.01)
*H04L 5/00* (2006.01)
(Continued)

(52) U.S. Cl.
CPC ......... *H04W 72/232* (2023.01); *H04L 5/0051* (2013.01); *H04W 72/1268* (2013.01)

(58) Field of Classification Search
CPC ............. H04W 52/365; H04W 72/232; H04W 72/0446; H04W 72/1268; H04W 72/23;
(Continued)

(56) References Cited

U.S. PATENT DOCUMENTS

2013/0294318 A1* 11/2013 Amerga .................. H04W 4/06 370/312
2018/0279327 A1* 9/2018 Ying ................. H04W 72/0446
2020/0107353 A1* 4/2020 Jung ..................... H04W 72/23

FOREIGN PATENT DOCUMENTS

WO WO 2022/082351 A1 4/2022
WO WO 2022/104687 A1 5/2022

OTHER PUBLICATIONS

International Search Report and Written Opinion for Application No. PCT/US2023/071947, mailed Dec. 19, 2023, 16 pages.
(Continued)

*Primary Examiner* — Wei Zhao
(74) *Attorney, Agent, or Firm* — Sterne, Kessler, Goldstein & Fox P.L.L.C.

(57) ABSTRACT

Some aspects of this disclosure relate to apparatuses and methods for supporting the transmission of phase tracking reference signals (PTRS) based on an association between one or more PTRS ports and one or more demodulation reference signals (DMRS) ports for a user equipment (UE) having multiple uplink (UL) antenna elements. The UE can receive a downlink control information (DCI) including an association indication contained in an association field of the DCI to indicate an association between one or more PTRS ports and one or more DMRS ports. The association field can have a bit width determined based on an antenna architecture of the UE including the number of UL antenna elements. The UE can further determine a DMRS port associated with a PTRS port based on the association indication
(Continued)

contained in the association field and the antenna architecture.

18 Claims, 6 Drawing Sheets

(51) Int. Cl.
*H04W 72/1268* (2023.01)
*H04W 72/232* (2023.01)

(58) Field of Classification Search
CPC ............ H04W 72/044; H04W 72/126; H04L 5/0051; H04L 5/0023; H04L 5/005
See application file for complete search history.

(56) References Cited

OTHER PUBLICATIONS

Ericsson, "Feature lead summary 3 of PT-RS", 3GPP Draft; R1-1803384 Feature Lead Summary 3 on PTRS_V3, 3rd Generation Partnership Project (3GPP), vol. RAN WG1, No. Athens, Greece; Feb. 26, 2018-Feb. 30, 2018, Mar. 1, 2018, pp. 1-12, XP051398617, Retrieved from the Internet: http://www.3gpp.org/ftp/tsg%5Fran/WG1%5FRL1/TSGR1%5F92/Docs/[retrieved on Mar. 1, 2018].
3GPP TS38.212; "Technical Specification Group Radio Access Network; Multiplexing and channel coding", Release 17, Mar. 2022, 208 pages.
3GPP TS38.214; "Technical Specification Group Radio Access Network; Physical later procedures for data" Release 17, Jun. 2022, 228 pages.
Samsung, "New WID: MIMO Evolution for Downlink and Uplink" RP-213598; 3GPP TSG Ran Meeting #94e, Dec. 6-17, 2021, 6 pages.

* cited by examiner

INDICATION OF PHASE TRACKING REFERENCE SIGNAL (PTRS) PORTS ASSOCIATION WITH DEMODULATION REFERENCE SIGNAL (DMRS) PORTS

CROSS-REFERENCE TO RELATED APPLICATIONS

This application claims the benefit of U.S. Provisional Patent Application No. 63/396,781, filed on Aug. 10, 2022, the contents of which are incorporated herein by reference in its entirety.

BACKGROUND

Field

The described aspects generally relate to indicating an association between one or more phase tracking reference signal (PTRS) ports and one or more demodulation reference signals (DMRS) ports in a wireless communication system.

Related Art

A user equipment (UE) communicates with a base station, such as an evolved Node B (eNB), a next generation node B (gNB), or other base station, in a wireless communication network or system. A wireless communication system can include a fifth generation (5G) system, a New Radio (NR) system, a long term evolution (LTE) system, a combination thereof, or some other wireless systems. In addition, a wireless communication system can support a wide range of use cases such as enhanced mobile broad band (eMBB), massive machine type communications (mMTC), ultra-reliable and low-latency communications (URLLC), and enhanced vehicle to anything communications (eV2X). There are challenges in various technologies such as a NR wireless system.

SUMMARY

Some aspects of this disclosure relate to apparatuses and methods for implementing techniques for a user equipment (UE) or a base station to support phase tracking reference signal (PTRS) using multiple uplink (UL) antenna elements of the UE. The transmission of the PTRS may be based on an association between one or more PTRS ports and one or more demodulation reference signals (DMRS) ports for the UE having multiple UL antenna elements. The implemented techniques can be applicable to many wireless systems, e.g., a wireless communication system based on 3rd Generation Partnership Project (3GPP) release 15 (Rel-15), release 16 (Rel-16), release 17 (Rel-17), release 18 (Rel-18), or beyond.

Some aspects of this disclosure relate to a UE. The UE may include a transceiver and a processor communicatively coupled to the transceiver. The transceiver is configured to communicate with a base station. The processor is configured to receive, from the base station, a downlink control information (DCI) including an association indication contained in an association field of the DCI to indicate an association between one or more phase tracking reference signal (PTRS) ports and one or more demodulation reference signals (DMRS) ports. In some embodiments, the association indication is contained in the association field of the DCI in a DCI format 0_1 or DCI format 0_2. The association indication is for configuration of uplink (UL) transmissions using a number of UL antenna elements of the UE. The association field may have a bit width determined based on an antenna architecture of the UE including the number of UL antenna elements, the number of UL antenna panels, the UL coherency. The processor may be further configured to determine a DMRS port associated with a PTRS port based on the association indication contained in the association field and the antenna architecture.

In some embodiments, the antenna architecture of the UE including the number of UL antenna elements may include a non-coherent antenna architecture, a fully coherent antenna architecture, or a partially coherent antenna architecture including multiple antenna panels. In some embodiments, the multiple antenna panels can be vertically stacked or horizontally stacked. Furthermore, the partially coherent antenna architecture may include two antenna panels, each antenna panel including four antenna elements; or four antenna panels, each antenna panel including two antenna elements.

In some embodiments, the bit width of the association field of the DCI may be higher than a number of bits for the association indication. In some embodiments, the base station is a first base station, the association indication is a first association indication for the first base station, and the association field of the DCI may include a second association indication to indicate a second association between one or more PTRS ports and one or more DMRS ports for configuration of UL transmissions from the UE to a second base station.

In some embodiments, the processor can be further configured to determine a Physical Uplink Shared Channel (PUSCH) antenna port associated with the PTRS port based on the antenna architecture of the UE; and transmit to the base station a PTRS through the PUSCH antenna port and the DMRS port associated with the PTRS port. The PUSCH antenna port associated with the PTRS port can be determined based on a predetermined mapping. In some embodiments, the bit width of the association field of the DCI may be determined further based on a rank configuration of PUSCH and a coherency of the antenna architecture. In some embodiments, the antenna architecture of the UE may include a partially coherent antenna architecture having multiple antenna panels, and the bit width of the association field of the DCI includes at least 4 bits.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1A:
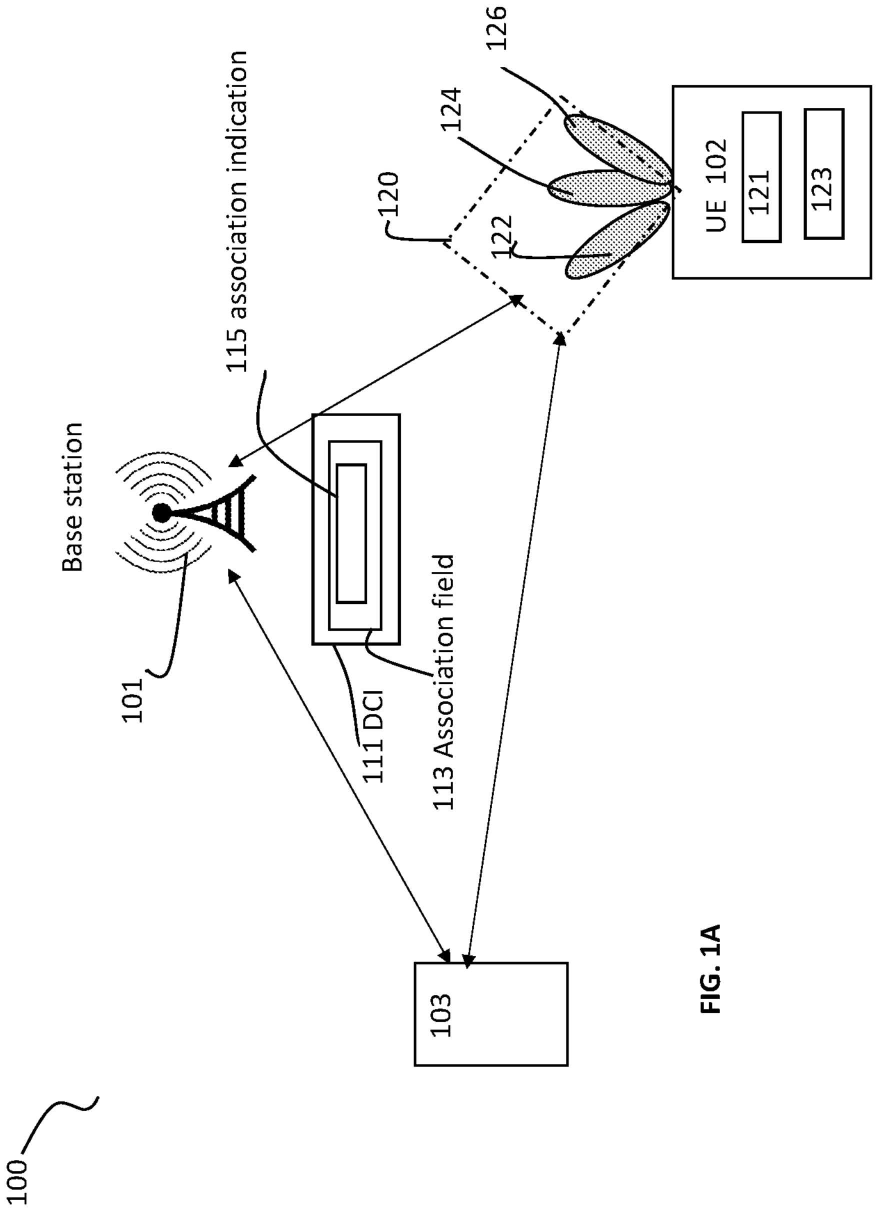
FIGS. 1A-1C illustrate an example wireless system supporting an association between phase tracking reference signal (PTRS) ports and demodulation reference signals (DMRS) ports in a wireless communication system, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In a wireless communication network or system, a user equipment (UE) communicates with a base station, such as an evolved Node B (eNB), a next generation node B (gNB), or other base station. A wireless communication system can include a fifth generation (5G) system, a New Radio (NR) system, a long term evolution (LTE) system, a combination thereof, or some other wireless systems. In a 5G NR or 4G LTE wireless system, multiple input-multiple output (MIMO) transmission can be an important technology. A UE can include an antenna array or system having a plurality of antenna panels, where an antenna panel can include an array of antenna elements that can be located in close physical location to each other. In some examples, an antenna can be a smart antenna system, where all antenna elements are considered as pseudo-omni or quasi-sector-omni antenna elements including a phase shifter. A directional beam, such as a transmission (Tx) beam or a receiving (Rx) beam, can be formed by adjusting the phase shifter of the antenna element.

In a wireless system, such as a NR wireless system, physical uplink shared channel (PUSCH) is the physical uplink (UL) channel that carries user data. Demodulation reference signals (DMRS) and phase tracking reference signals (PTRS) are the reference signals associated with the PUSCH. DMRS can be used for channel estimation as part of coherent demodulation of the PUSCH. In addition, PTRS can be used to facilitate the receiver to estimate the phase noise for the PUSCH. The phase noise of a transmitter increases as the frequency of operation increases, and the PTRS can be used to mitigate the phase noise at the receiver. For example, the PTRS plays an important role at mmWave frequencies to minimize the effect of the oscillator phase noise on system performance. PTRS can enable suppression of phase noise and common phase error, especially at higher mmWave frequencies. PTRS can be associated with a DMRS port during transmission, and can be further confined to the PUSCH transmission.

In some embodiments, a PTRS antenna port for transmitting the PTRS can be associated with a DMRS antenna port, as indicated by an association between the PTRS antenna port and the DMRS antenna port. A PTRS antenna port can be simplify referred to as PTRS port, and similarly, a DMRS antenna port can be referred to as a DMRS port. Accordingly, an association between a PTRS port and a DMRS port indicates that the associated DMRS port is also used for transmission of the PTRS. In some implementations, for UL PUSCH, PTRS can be configured with maximum 2 ports, and PTRS is associated with a DMRS port by an association indication received from the network or the base station. For example, the DMRS to PTRS port association can be indicated by a "PTRS-DMRS association" field in a downlink control information (DCI) having DCI format 0_1/0_2. In general, the existing "PTRS-DMRS association" field can be either 0 or 2 bits. Such restrictions of the bit width on the association indication to indicate an association between PTRS ports and DMRS ports may be applicable to some limited antenna architectures, and may not be applicable in some antenna architectures with more antenna elements.

Currently, antenna architectures may be implemented to include higher number of antenna elements and PTRS ports that exceed the current limited capabilities of association between a PTRS port and a DMRS port. Accordingly, an antenna architecture having higher number of antenna elements may require different phase noise handling and PTRS enhancement to fulfill system requirements. Embodiments herein present such techniques for an association indication contained in an association field of the DCI to indicate an association between the PTRS ports and the DMRS ports. The association field can have a bit width determined based on an antenna architecture of the UE. Similarly, a DMRS port associated with a PTRS port can be determined based on the association indication contained in the association field and the antenna architecture. In addition, a PUSCH antenna port associated with the PTRS port can be determined similarly based on the antenna architecture of the UE. The UE can transmit to the base station a PTRS port through the PUSCH antenna port(s) and the DMRS port associated with the PTRS port.

Figure 1B:
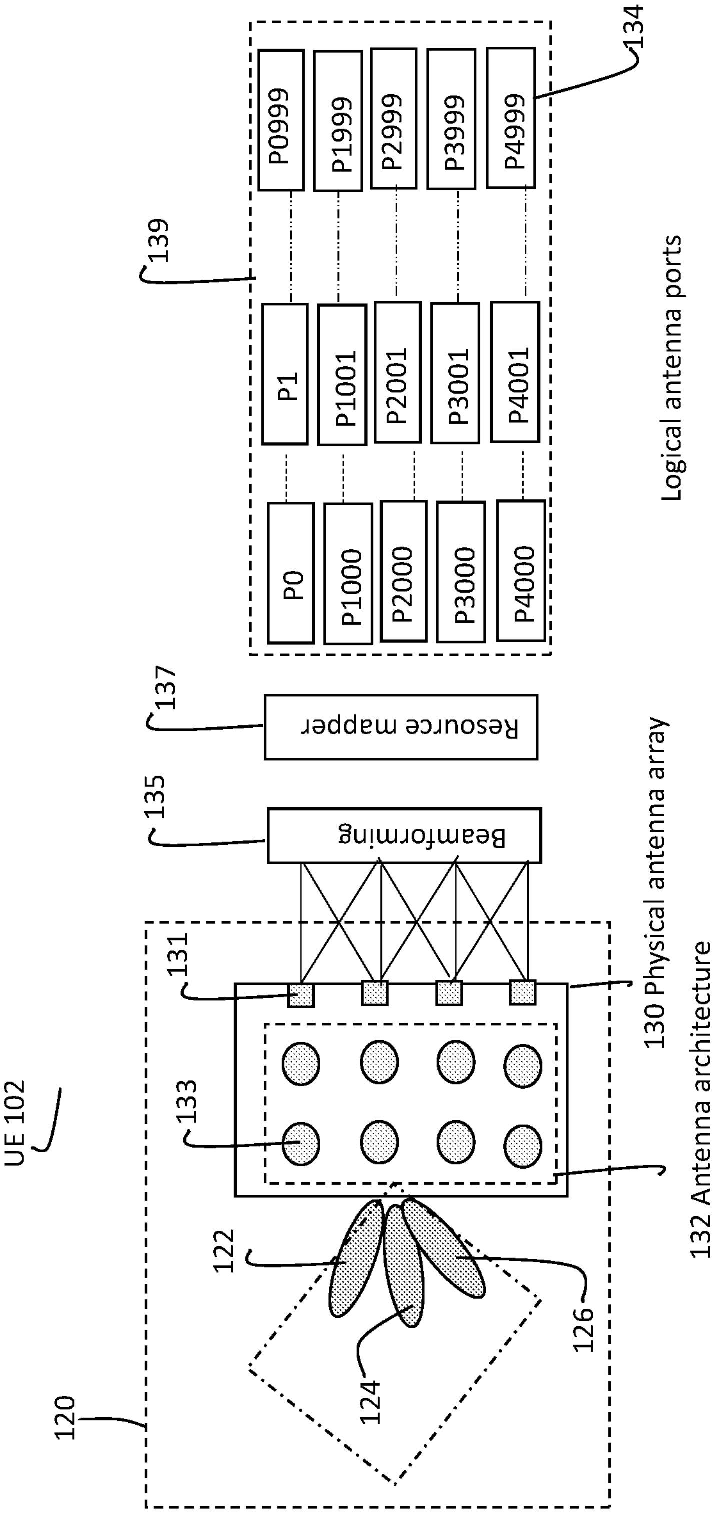
Figure 1C:
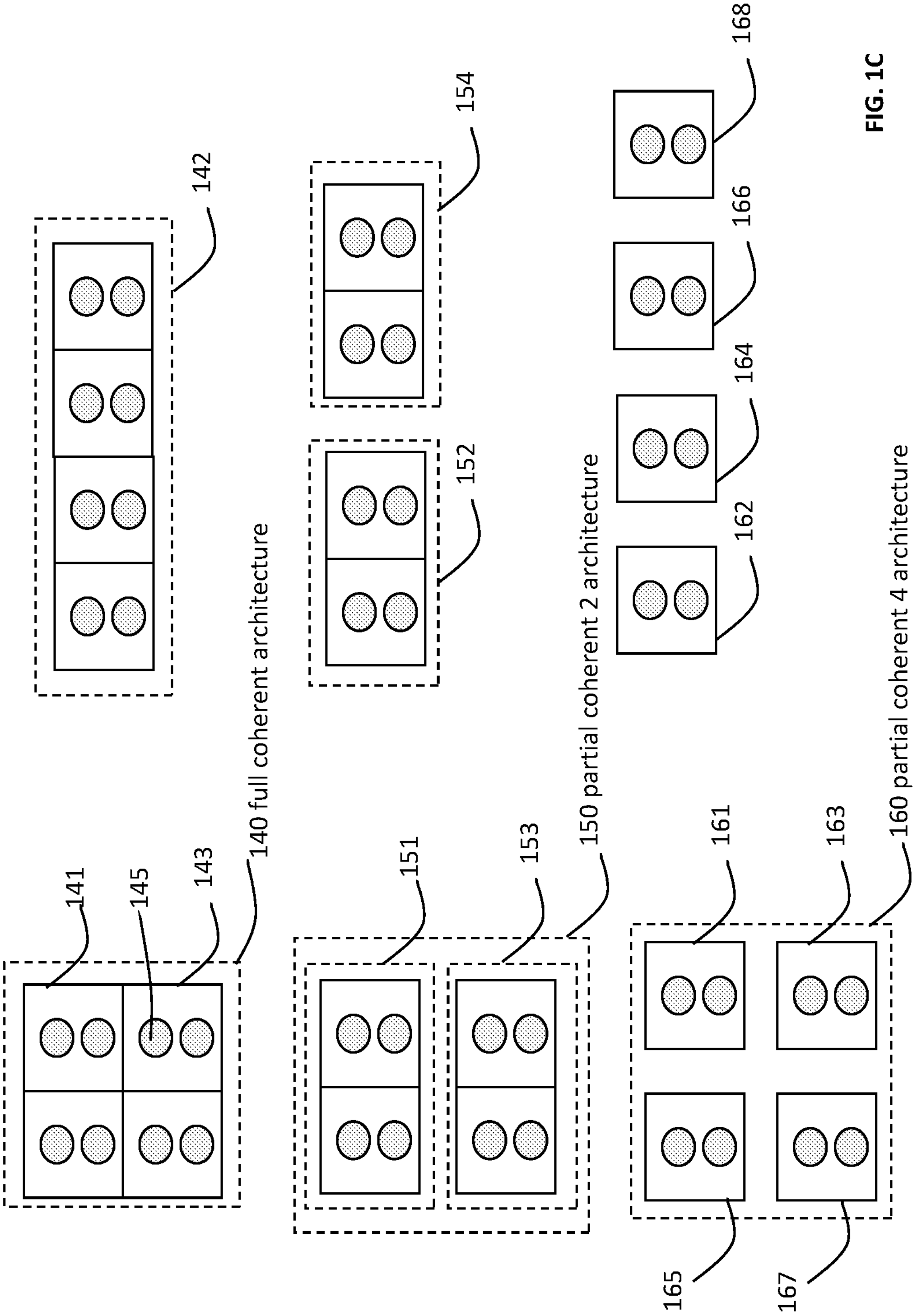

FIGS. 1A-1C illustrate an example wireless system 100 supporting an association between PTRS ports and DMRS ports in a wireless communication system, according to some aspects of the disclosure. The wireless system 100 is provided for the purpose of illustration only and does not limit the disclosed aspects. As shown in FIG. 1A, system 100 can include, but is not limited to, a network node (herein referred to as a base station) 101, another base station 103, and one or more UEs, such as a UE 102. System 100 can further include additional components, not shown.

According to some aspects, a base station, such as base station 101 or base station 103, can include a node configured to operate based on a wide variety of wireless communication techniques such as, but not limited to, techniques based on 3rd Generation Partnership Project (3GPP) standards. For example, base station 101 can include a node configured to operate using Rel-16, Rel-17, or others. The base station 101 can be a fixed station, and may also be called a base transceiver system (BTS), an access point (AP), a transmission/reception point (TRP), an evolved NodeB (eNB), a next generation node B (gNB), or some other equivalent terminology. The system 100 can operate using both licensed cellular spectrum (known as in-band communication) and unlicensed spectrum (known as out-band communication).

According to some aspects, UE 102 can be configured to operate based on a wide variety of wireless communication techniques. These techniques can include, but are not limited to, techniques based on 3GPP standards. For example, UE 102 can be configured to operate using Rel-16, Rel-17 or later. UE 102 can include, but is not limited to, a wireless communication device, a smart phone, a laptop, a desktop, a tablet, a personal assistant, a monitor, a television, a wearable device, an Internet of Things (IoTs), a vehicle's communication device, a mobile station, a subscriber station, a remote terminal, a wireless terminal, a user device, or the like.

According to some aspects, UE 102 can include an antenna array or system 120 having a plurality of antenna panels. In general, an antenna system can include one or more antenna panels. An antenna panel can include an array of antenna elements that can be located in close physical location to each other. An antenna element can be an omnidirectional antenna element, a quasi-omnidirectional antenna element, a directional antenna element, or any other antenna element. In some examples, antenna can be a smart antenna system, where all antenna elements are considered as pseudo-omni or quasi-sector-omni antenna elements and include a phase shifter. A directional beam, such as a transmission (Tx) beam or a receiving (Rx) beam, can be formed by adjusting the phase shifter of one or more of the antenna elements. Accordingly, antenna system 120 can provide corresponding antenna beam (herein "beam") 122, beam 124, beam 126. In some examples, there can be more or fewer antenna panels, and an antenna panel can include 2, 4, 8, 16, or other number of antenna elements, which can include a dipole antenna element, a monopole antenna element, a patch antenna element, a loop antenna element, a microstrip antenna element, or any other type of antenna elements suitable for transmission of RF signals.

In some embodiments, more details of UE 102 and antenna system 120 are shown in FIG. 1B. Antenna system 120 can include a physical antenna array 130 having physical antenna ports 131 and multiple antenna elements, such as antenna element 133, which can form an antenna architecture 132. Various antenna architectures can be shown in FIG. 1C. Antenna elements 133 can provide antenna beams, such as beam 122, beam 124, and beam 126 based on signal excitation through the antenna ports 131. In addition, UE 102 can include beamforming component 135 and resource mapper 137. Furthermore, UE 102 can include a group of multiple logic antenna ports 139, which may be simply refers to be "antenna ports" and stored in a memory of the UE, such as memory 201 in FIG. 2. Each antenna port 134 can be related to a function performed by UE 102. Accordingly, the term "antenna port" is a logical concept related to physical layer (L1), but is distinct from the physical RF antenna which is visible and tangible. In other words, each individual downlink or uplink transmission can be carried out from a specific antenna port, the identity of which is known to the UE. In some embodiments, an antenna port can be represented as corresponding to a specific reference signal, such as a PTRS port or a DMRS port. The reference signals can also be used by the UE to derive channel-state information related to the antenna port.

In some embodiments, as examples, the set of antenna ports defined in 3GPP specification 38.211 for 5G NR can be listed below:

PDSCH (Downlink Shared Channel): Antenna Port Starting from 1000 (1000 Series);

PDCCH (Control Channel): Antenna Port Starting from 2000 (2000 Series);

CSI-RS (Channel State Information): Antenna Port starting from 3000 (3000 Series);

SS-Block/PBCH (Broadcast Channel): Antenna Port Starting from 4000 (4000 Series);

PUSCH/DMRS (Uplink Shared Channel): Antenna Port Starting from 1000 (0 Series);

SRS, precoded PUSCH: Antenna Port Starting from 1000 (1000 Series);

PUCCH (Uplink Control Channel): Antenna Port Starting from 2000 (2000 Series); and PRACH (Random Access): Antenna Port Starting from 4000 (4000 Series).

As seen above, there is a defined structure in the antenna port numbering such that the antenna ports used for different purposes can have numbers in different ranges. For example, downlink antenna ports starting with 1000 are used for PDSCH. Different transmission layers for PDSCH can use antenna ports in this series, for example, 1000 and 1001 for a two-layer PDSCH transmission. Accordingly, it should be understood herein that an "antenna port" can be a logical concept that is tied to particular function (e.g., PDSCH), but does not necessarily correspond to a specific physical antenna port, even though a physical antenna port is ultimately used signal transmission. There is no strict mapping of antenna ports 139 to physical antenna ports 131 in NR, as well as in LTE. There can be a one-to-one mapping between a particular antenna port 134 to a physical antenna port 131. In some embodiments, there can be a multiple-to-one mapping between multiple antenna ports 134 to a physical antenna port 131. The mapping of antenna port 134 to physical antenna ports 131 can be controlled by beam forming component 135 as a given beam may need to transmit the signal on one or more particular antenna ports to form a desired beam.

In some embodiments, the antenna architecture 132 of UE 102 can be a non-coherent antenna architecture, a fully coherent antenna architecture, or a partially coherent antenna architecture including multiple antenna panels. In some embodiments, as shown in FIG. 1C, UE 102 can include a fully coherent antenna architecture 140 having 8 antenna element 145 in one antenna panel 141 and 4 antenna groups 143, where an antenna group 143 can include two antenna elements 145. Antenna panel 141 can be coherent within itself with one phase noise. Antenna panel 141 can have the 4 antenna groups 143 vertically stacked. In some embodiments, antenna panel 142 can have the 4 antenna groups horizontally stacked. The antenna architecture 140 shown for antenna panel 141 can be referred to as a "fully coherent architecture".

In some embodiments, the partially coherent antenna architecture can include two antenna panels, each antenna panel including four antenna elements. As shown in FIG. 1C, a partially coherent antenna architecture 150 can include two antenna panels, antenna panel 151 and antenna panel 153, each antenna panel including four antenna elements. Antenna panel 151 can be coherent within itself with one phase noise, similarly, antenna panel 153 can be coherent within itself with one phase noise. However, antenna panel 151 and antenna 153 can be non-coherent with different phase noises. In some embodiments, antenna panel 152 and antenna panel 154 can be horizontally stacked. Antenna architecture 150 can be referred to as a "partial coherent 2 architecture."

In some embodiments, the partially coherent antenna architecture 160 includes four antenna panels, each antenna panel including two antenna elements. As shown in FIG. 1C, a partially coherent antenna architecture can include four antenna panels, antenna panel 161, antenna panel 163, antenna panel 165, and antenna panel 167, each antenna panel including two antenna elements. Antenna panel 161 can be coherent within itself with one phase noise. Similarly, antenna panel 163, antenna panel 165, and antenna panel 167 can be coherent within their respective selves with one phase noise. However, antenna panel 161, antenna panel 163, antenna panel 165, and antenna panel 167 can be non-coherent with different phase noises. In some embodiments, antenna panel 162, antenna panel 164, antenna panel 166, and antenna panel 168 can be horizontally stacked. Antenna architecture 160 can be referred to as a "partial coherent 4 architecture."

In some embodiments, the various antenna architecture, such as the antenna architecture 140 referred as a "fully coherent architecture", the antenna architecture 150 as a "partial coherent 2 architecture," the antenna architecture 160 as a "partial coherent 4 architecture," are for example only, and are shown for only 8 Tx antenna elements, but the number of antenna elements is not meant to be limiting. For a different number of Tx antenna elements, an antenna architecture that is a "fully coherent architecture", a "partial coherent 2 architecture," and a "partial coherent 4 architecture" can be similarly defined and will understood by those skilled in the art based on the discussion here. Accordingly, operations described herein for an antenna architecture that is a "fully coherent architecture", a "partial coherent 2 architecture," and a "partial coherent 4 architecture" can be similarly applicable as illustrated in the current disclosure.

According to some aspects, referring back to FIG. 1A, UE 102 can include a transceiver 121 and a processor 123 communicatively coupled to transceiver 121. Transceiver 121 can be configured to wirelessly communicate with base station 101 and base station 103. According to some aspects, processor 123 can be configured to perform various operations. In some embodiments, UE 102 can receive from base station 101, a downlink control information (DCI) 111 including an association indication 115 contained in an association field 113 of the DCI 111 to indicate an association between one or more PTRS ports and one or more DMRS ports. The association indication 115 can be used for configuration of uplink (UL) transmissions using a number of UL antenna elements of UE 102. In some embodiments, the association field 113 can have a bit width determined based on an antenna architecture of the UE including the number of UL antenna elements, with more details may be provided by the descriptions for FIG. 3. In other words, the bit width (e.g. size) of the association field varies with differing antenna architecture to better provide efficient solutions considering the phase noises associated with the antenna architecture.

In some embodiments, the bit width of the association field 113 of the DCI 111 can be greater than a number of bits for the association indication 115. Accordingly, the association indication 115 can be a first association indication for base station 101, and the association field 113 of the DCI 111 can include a second association indication to indicate a second association between one or more PTRS ports and one or more DMRS ports for configuration of UL transmissions from UE 102 to base station 103.

Figure 2:
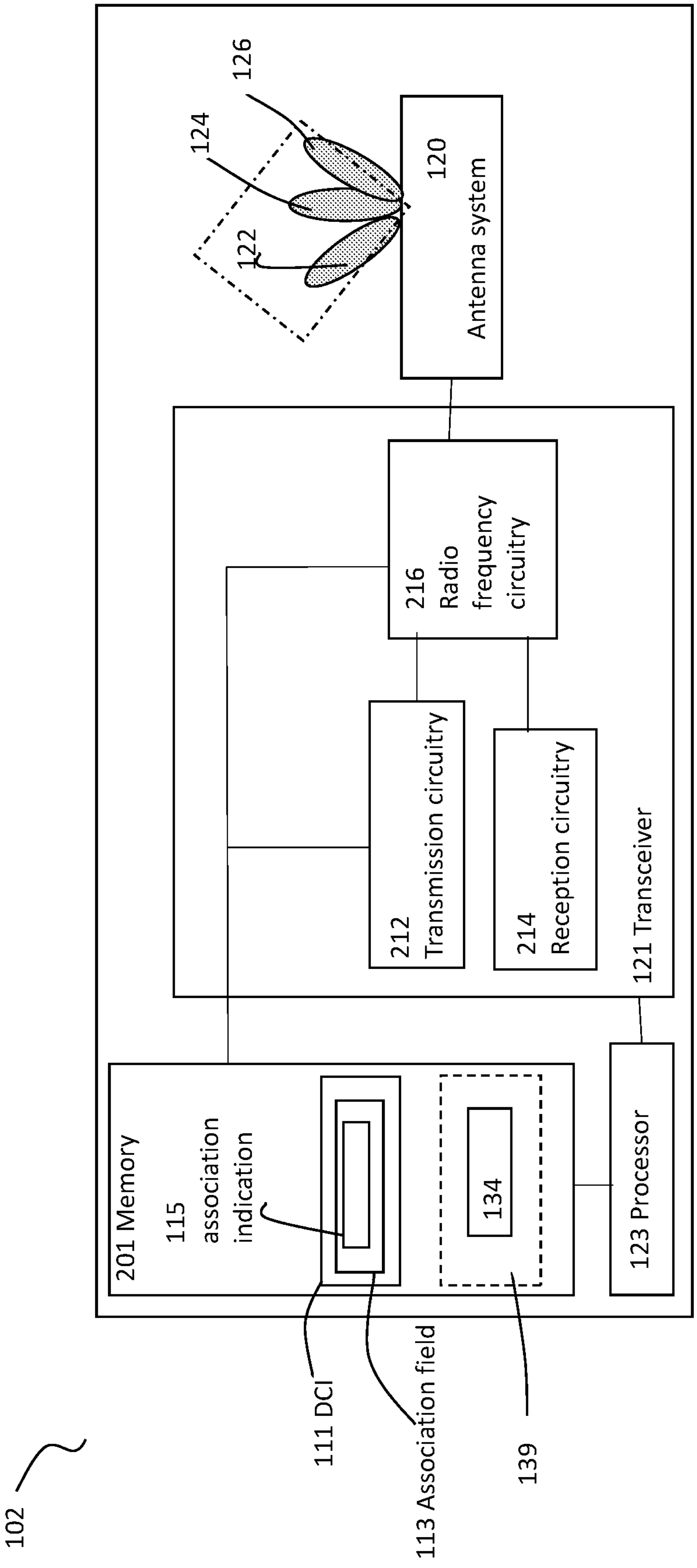
FIG. 2 illustrates a block diagram of a UE implementing support for an association between PTRS ports and DMRS ports in a wireless communication system, according to some aspects of the disclosure.

According to some aspects, UE 102 can be implemented according to a block diagram as illustrated in FIG. 2.

Referring to FIG. 2, UE 102 can have antenna system 120 including one or more antenna elements to form various beams, e.g., beam 122, beam 124, or beam 126, coupled to transceiver 121 and controlled by processor 123. Transceiver 121 and antenna system 120 can be configured to enable wireless communication in a wireless network, such as wireless system 100, including wireless communication with base station 101. In detail, transceiver 121 can include radio frequency (RF) circuitry 216, transmission circuitry 212, and reception circuitry 214 to enable wireless communication with other UEs and/or a base station as discussed for wireless system 100. RF circuitry 216 can include multiple parallel RF chains for one or more of transmit or receive functions, each connected to one or more antenna elements of the antenna panel. In addition, processor 123 can be communicatively coupled to a memory 201, which are further coupled to the transceiver 121. Various data can be stored in memory 201. In some examples, memory 201 can store DCI 111 received from base station 101. In detail, DCI 111 can include association field 113 containing association indication 115.

In some embodiments, memory 201 can store instructions, that when executed by processor 123 perform or cause to perform operations described herein, e.g., operations to support an association between PTRS ports and DMRS ports in a wireless communication system. Alternatively, processor 123 can be "hard-coded" to perform the operations described herein. In some embodiments, processor 123 can be configured to perform operations described for FIG. 3.

Figure 3:
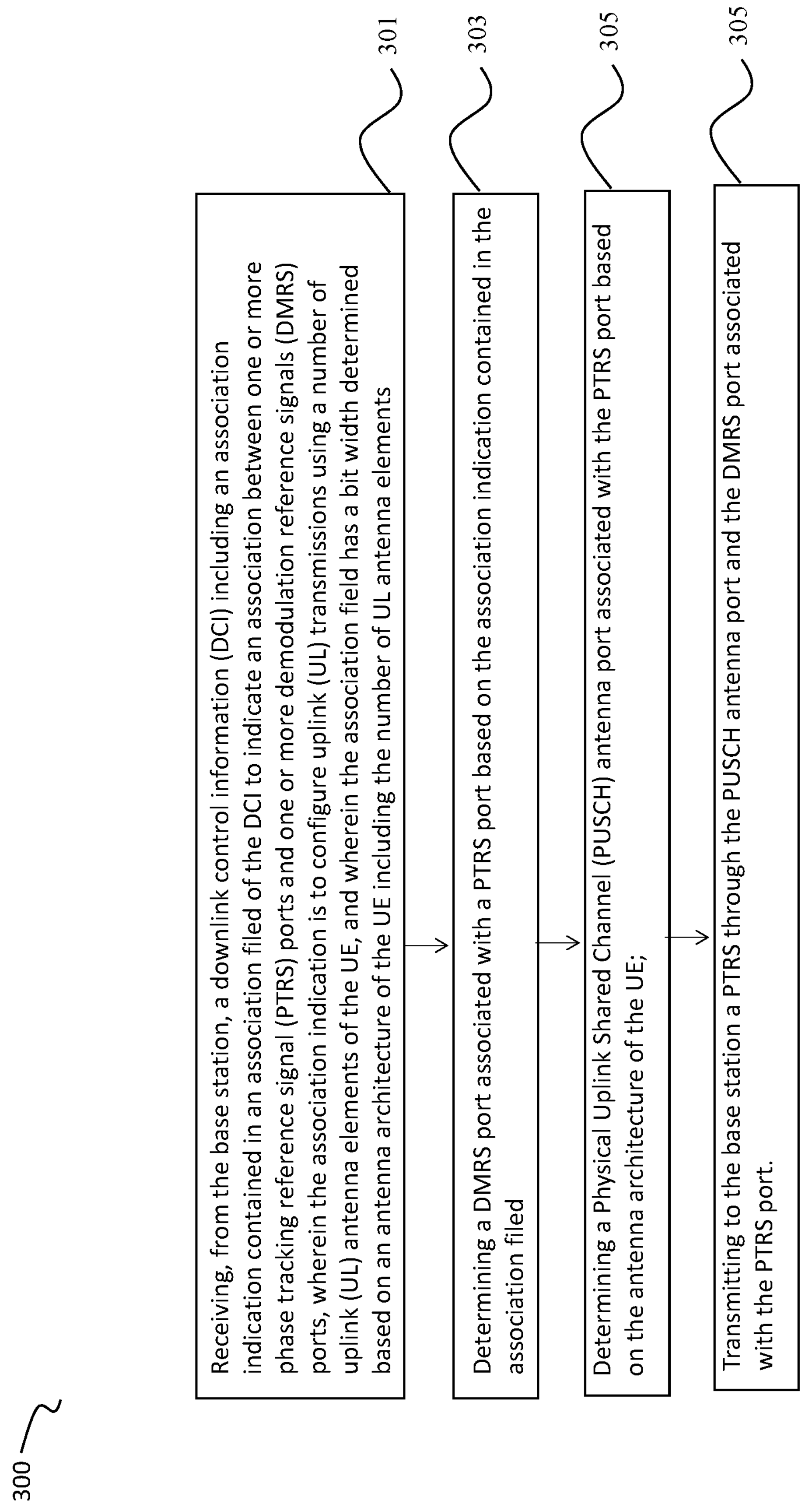
FIG. 3 illustrates an example process performed by a UE supporting an association between PTRS ports and DMRS ports in a wireless communication system, according to some aspects of the disclosure.

FIG. 3 illustrates an example process 300 performed by UE 102 supporting an association between PTRS ports and DMRS ports in a wireless communication system, according to some aspects of the disclosure. Process 300 can be performed by UE 102, which may be implemented as shown in FIG. 2. Process 300 may also be performed by a computer system 400 of FIG. 4. Process 300 is not limited to the specific aspects depicted in those figures and other systems may be used to perform the method as will be understood by those skilled in the art. It is to be appreciated that not all operations may be needed, and the operations may not be performed in the same order as shown in process 300.

At 301, processor 123 of UE 102 can receive, from base station 101, a DCI including an association indication contained in an association field of the DCI to indicate an association between one or more PTRS ports and one or more DMRS ports. The association indication is for configuration of UL transmissions using a number of UL antenna elements of the UE. The association field has a bit width determined based on an antenna architecture of the UE including the number of UL antenna elements. For example, processor 123 can receive DCI 111 including association indication 115 contained in association field 113 of DCI 111 to indicate an association between one or more PTRS ports and one or more DMRS ports. The association indication 115 is for configuration of UL transmissions using a number of UL antenna elements of UE 102. The association field 113 can have a bit width determined based on an antenna architecture of UE 102 including the number of UL antenna elements.

In some embodiments, when base station 101 configures an 8 Tx UL operation, more than 2 bit can be configured for the "PTRS-DMRS association" field in DCI format 0_1 and DCI format 0_2 for the association field 113. In some embodiments, the association field 113 can be referred to as the "PTRS-DMRS association" field. In some embodiments, the association field 113 can have 4 bits configured as the "PTRS-DMRS association" field. Base station 101 can configure the 8 Tx operation by either configuring a Sounding Reference Signal (SRS) resource set with usage of a codebook having 8 ports SRS resource, or configuring SRS resource set with usage of a nonCodebook with 8 SRS resources each with single port in the set.

In some embodiments, the bit width of the association field 113 of DCI 111 can be determined further based on a rank configuration of PUSCH and a coherency of the antenna architecture. When base station 101 configures 8 Tx UL operation, the bit width of the "PTRS-DMRS association" field in DCI format 0_1 and DCI format 0_2 for the association field 113 can be determined based on the maxRank configuration in PUSCH-Config. For maxRank=1, the "PTRS-DMRS association" field can be 0 bit. In addition, for maxRank=2, the "PTRS-DMRS association" field can be 2 or 4 bits. Furthermore, for maxRank>2, the "PTRS-DMRS association" field can be 4 bits.

In some embodiments, when the network or base station 101 configures the 8 Tx UL operation, the bit width of the "PTRS-DMRS association" field in DCI format 0_1 and DCI format 0_2 can be determined based on the coherency of the antenna architecture. For a fully coherent architecture, such as the antenna architecture 140, the "PTRS-DMRS association" field can include 2 or 3 bits. For a non-coherent architecture, the "PTRS-DMRS association" field can include 4 bits. For a partial coherent 2 architecture shown as antenna architecture 150, the "PTRS-DMRS association" field can include 4 bits. In addition, for a partial coherent 4 architecture shown as antenna architecture 160, the "PTRS-DMRS association" field can include 4 bits.

In some embodiments, when base station 101 configures 8 Tx UL operation, the following Table 1 lists some bit widths of the "PTRS-DMRS association" field in DCI format 0_1 and DCI format 0_2 depending on the rank, e.g., maxRank and coherency of the antenna architecture.

TABLE 1

| maxRank | Coherency | "PTRS DMRS association" bitwidth |
|---|---|---|
| 1 | — | 0 bit |
| 2 | — | 1 or 2 bit |
| 4 | nonCoherent | 2 bits |
| 4 | FullCoherent | 2 bits |
| 4 | PartialCoherent2 | 2 bits |
| 4 | PartialCoherent4 | 2 bits |
| 6/8 | nonCoherent | 4 bits |
| 6/8 | FullCoherent | 2 or 3 bits |
| 6/8 | PartialCoherent2 | 4 bits |
| 6/8 | PartialCoherent4 | 4 bits |

At 303, processor 123 of UE 102 can determine a DMRS port associated with a PTRS port based on the association indication contained in the association field and the antenna architecture.

In some embodiments, for a fully coherent architecture, such as the antenna architecture 140, base station 101 can configure the "PTRS-DMRS association" field in DCI format 0_1 and DCI format 0_2 in various options for the 8Tx UL operation. In some embodiments, there can be only 2 bits used for the "PTRS-DMRS association" field, each code word (CW) can contain at most 4 layers (DMRS ports). 2 bits can be used to associate the PTRS port with one of the 4 DMRS ports (layers). The CW with the largest transport block (TB) (MCS) can be selected as the DMRS port associated with a PTRS port. If both CWs have the same TB (MCS), UE 102 can select either the first or the second CW and its DMRS port as the DMRS port associated with a PTRS port. Additionally and alternatively, the DMRS port with a smaller or larger index can be selected as the DMRS port associated with a PTRS port.

In some embodiments, for a fully coherent architecture, such as the antenna architecture 140, there can be 3 bits used for the "PTRS-DMRS association" field to indicate the association between a PTRS port with one of the 8 DMRS ports (layers). In some embodiments, if the "PTRS-DMRS association" field contains more bits, e.g., 4 bits, the extra most significant bits (MSB) can be ignored. In some embodiments, if the "PTRS-DMRS association" field contains more bits, e.g., 4 bits, the extra MSB can be used for the second TRP, i.e., the second SRS-ResourceSet. For example, if the "PTRS-DMRS association" field contains 4 bits, and 2 bits are used per TRP, 2 MSB can be used for the first TRP, and 2 LSB can be used for the second TRP. Here, transmission/reception point (TRP) is used interchangeably with a base station.

In some embodiments, for a partial coherent 2 architecture, such as the antenna architecture 150, the following Table 2 can be used to select the DMRS port associated with a PTRS port. For Multi-TRP PUSCH repetition, additional "PTRS-DMRS association" fields can be configured for the second TRP by the second SRS-ResourceSet.

TABLE 2

| Value of 2 MSB | DMRS port associated with PTRS Port 0 | Value of 2 LSB | DMRS port associated with PTRS Port 1 |
|---|---|---|---|
| "00" | 1st scheduled DMRS port corresponding to SRS resource indicator field and/or Precoding information and number of layers field | "00" | 1st scheduled DMRS port corresponding to SRS resource indicator field and/or Precoding information and number of layers field |
| "01" | 2nd scheduled DMRS port corresponding to SRS resource indicator field and/or Precoding information and number of layers field | "01" | 2nd scheduled DMRS port corresponding to SRS resource indicator field and/or Precoding information and number of layers field |
| "10" | 3rd scheduled DMRS port corresponding to SRS resource indicator field and/or Precoding information and number of layers field | "10" | 3rd scheduled DMRS port corresponding to SRS resource indicator field and/or Precoding information and number of layers field |
| "11" | 4th scheduled DMRS port corresponding to SRS resource indicator field and/or Precoding information and number of layers field | "11" | 4th scheduled DMRS port corresponding to SRS resource indicator field and/or Precoding information and number of layers field |

In some embodiments, for a partial coherent 4 architecture such as the antenna architecture 160, assuming a 4 bit {b3, b2, b1, b0} is used for the "PTRS-DMRS association" field, the following Table 3 can be used to select the DMRS port associated with a PTRS port. For Multi-TRP PUSCH repetition, an additional "PTRS-DMRS association" field can be configured for the second TRP, such as the second SRS-ResourceSet.

TABLE 3

| Value of b3 | DMRS port associated with PTRS Port 0 | Value of b2 | DMRS port associated with PTRS Port 1 |
|---|---|---|---|
| "0" | 1st scheduled DMRS port corresponding to SRS resource indicator field and/or Precoding information and number of layers field | "0" | 1st scheduled DMRS port corresponding to SRS resource indicator field and/or Precoding information and number of layers field |
| "1" | 2nd scheduled DMRS port corresponding to SRS resource indicator field and/or Precoding information and number of layers field | "1" | 2nd scheduled DMRS port corresponding to SRS resource indicator field and/or Precoding information and number of layers field |
| **Value of b1** | **DMRS port associated with PTRS Port 2** | **Value of b0** | **DMRS port associated with PTRS Port 3** |
| "0" | 1st scheduled DMRS port corresponding to SRS resource indicator field and/or Precoding information and number of layers field | "0" | 1st scheduled DMRS port corresponding to SRS resource indicator field and/or Precoding information and number of layers field |
| "1" | 2nd scheduled DMRS port corresponding to SRS resource indicator field and/or Precoding information and number of layers field | "1" | 2nd scheduled DMRS port corresponding to SRS resource indicator field and/or Precoding information and number of layers field |

In some embodiments, if the mapping between a PUSCH antenna port and a PTRS port is hardcoded in the specification, for a partial coherent 4 architecture shown as the antenna architecture 160, if the mapping between the PUSCH antenna port and the PTRS port is hardcoded in the specification, the following are two examples.

In some embodiments, for a non-coherent antenna architecture, the "PTRS-DMRS association" field in DCI format 0_1 and DCI format 0_2 design option can either follow the same design as partial coherent 4 architecture shown for the antenna architecture 160, or partial coherent 2 architecture shown as the antenna architecture 150.

At 305, processor 123 of UE 102 can determine a PUSCH antenna port associated with the PTRS port based on the antenna architecture of the UE.

In some embodiments, for the PTRS-DMRS association indication, the mapping between the PUSCH antenna port and the PTRS port can be hardcoded in the specification. Additionally and alternatively, the mapping between the PUSCH antenna port and the PTRS port can be configured by base station 101, e.g., via RRC or MAC-CE. In some embodiments, the PUSCH shares the same antenna port as SRS.

In some embodiments, if the mapping between the PUSCH antenna port and the PTRS port is hardcoded in the specification, for the non-coherent architecture, the mapping between the PUSCH antenna port and the PTRS port can be configured either following the same mapping as the partial coherent 4 architecture shown for the antenna architecture 160, or partial coherent 2 architecture shown for the antenna architecture 150. In some embodiments, if the mapping between a PUSCH antenna port and a PTRS port is hardcoded in the specification, for a partial coherent 2 architecture shown as the antenna architecture 150, the following Table 4 can be an example.

TABLE 4

| PUSCH antenna port | Shared PTRS port |
|---|---|
| 1000, 1002, 1004, 1006 | PTRS port 0 |
| 1001, 1003, 1005, 1007 | PTRS port 1 |

TABLE 5

| PUSCH antenna port | Shared PTRS port |
|---|---|
| 1000, 1002 | PTRS port 0 |
| 1001, 1003 | PTRS port 1 |
| 1004, 1006 | PTRS port 2 |
| 1005, 1007 | PTRS port 3 |

TABLE 6

| PUSCH antenna port | Shared PTRS port |
|---|---|
| 1000, 1004 | PTRS port 0 |
| 1001, 1005 | PTRS port 1 |
| 1002, 1006 | PTRS port 2 |
| 1003, 1007 | PTRS port 3 |

At 307, processor 123 of UE 102 can transmit to the base station a PTRS through the PUSCH antenna port and the DMRS port associated with the PTRS port.

Figure 4:
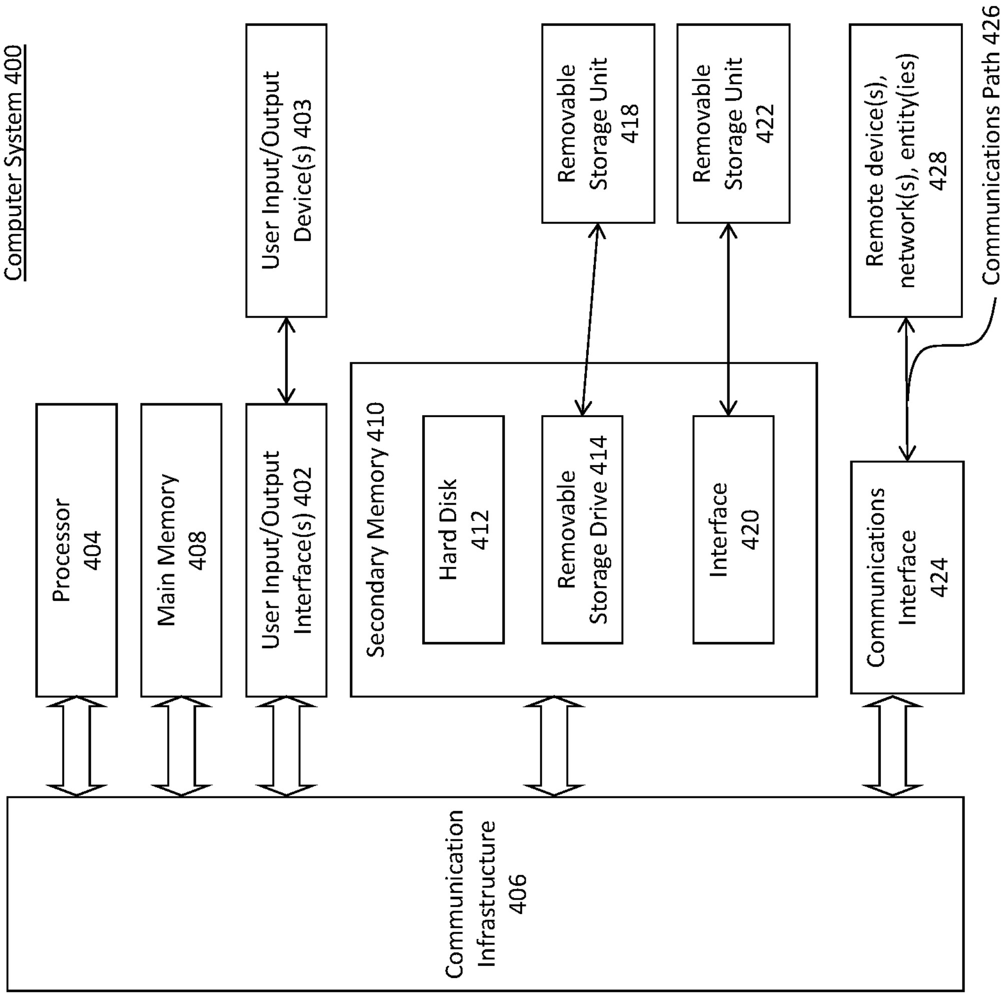
FIG. 4 is an example computer system for implementing some aspects or portion(s) thereof of the disclosure provided herein.

Various aspects can be implemented, for example, using one or more computer systems, such as computer system 400 shown in FIG. 4. Computer system 400 can be any computer capable of performing the functions described herein such as UE 102 or base station 101 in FIG. 1, for operations described for processor 123 or process 300. Computer system 400 includes one or more processors (also called central processing units, or CPUs), such as a processor 404. Processor 404 is connected to a communication infrastructure 406 (e.g., a bus). Computer system 400 also includes user input/output device(s) 403, such as monitors, keyboards, pointing devices, etc., that communicate with communication infrastructure 406 through user input/output interface(s) 402. Computer system 400 also includes a main or primary memory 408, such as random access memory (RAM). Main memory 408 may include one or more levels of cache. Main memory 408 has stored therein control logic (e.g., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to some aspects, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 408, the removable storage unit 418, the removable storage unit 422 can store instructions that, when executed by processor 404, cause processor 404 to perform operations for a UE, UE 102 or base station 101 in in FIG. 1, for operations described for processor 123 or process 300.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 400, main memory 408, secondary memory 410 and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 4. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

For one or more embodiments or examples, at least one of the components set forth in one or more of the preceding figures may be configured to perform one or more operations, techniques, processes, and/or methods as set forth in the example section below. For example, circuitry associated with a UE, base station, network element, etc. as described above in connection with one or more of the preceding figures may be configured to operate in accordance with one or more of the examples set forth below in the example section.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A method for wireless communications by a user equipment (UE) with a base station in a wireless system, comprising:

receiving, from the base station, a downlink control information (DCI) including an association indication contained in an association field of the DCI to indicate an association between one or more phase tracking reference signal (PTRS) ports and one or more demodulation reference signals (DMRS) ports, wherein the association indication is for configuration of uplink (UL) transmissions using a number of UL antenna elements of the UE, and wherein the association field has a bit width determined based on an antenna architecture of the UE, the antenna architecture including the number of UL antenna elements of the UE;

determining a DMRS port associated with a PTRS port based on the association indication contained in the association field and the antenna architecture;

determining a Physical Uplink Shared Channel (PUSCH) antenna port associated with the PTRS port based on the antenna architecture of the UE; and transmitting to the base station a PTRS through the PUSCH antenna port and the DMRS port associated with the PTRS port.

2. The method of claim 1, wherein the association indication is contained in the association field of the DCI in a DCI format 0_1 or DCI format 0_2.

3. The method of claim 1, wherein the antenna architecture of the UE further includes a non-coherent antenna architecture, a fully coherent antenna architecture, or a partially coherent antenna architecture including multiple antenna panels.

4. The method of claim 3, wherein the partially coherent antenna architecture includes:

two antenna panels, each antenna panel including four antenna elements; or four antenna panels, each antenna panel including two antenna elements.

5. The method of claim 3, wherein the multiple antenna panels are vertically stacked or horizontally stacked.

6. The method of claim 1, wherein the bit width of the association field of the DCI is greater than a number of bits for the association indication.

7. The method of claim 6, wherein the base station is a first base station, the association indication is a first association indication for the first base station, and the association field of the DCI includes a second association indication to indicate a second association between one or more PTRS ports and one or more DMRS ports for configuration of UL transmissions from the UE to a second base station.

8. The method of claim 1, wherein the PUSCH antenna port associated with the PTRS port is determined based on a predetermined mapping.

9. The method of claim 1, wherein the bit width of the association field of the DCI is further determined based on a rank configuration of PUSCH and a coherency of the antenna architecture.

10. The method of claim 9, wherein the antenna architecture of the UE includes a partially coherent antenna architecture having multiple antenna panels, and the bit width of the association field of the DCI includes at least 4 bits.

11. A user equipment (UE) in a wireless system, comprising:

a transceiver configured to communicate with a base station; and a processor communicatively coupled to the transceiver and configured to:

receive, from the base station, a downlink control information (DCI) including an association indication contained in an association field of the DCI to indicate an association between one or more phase tracking reference signal (PTRS) ports and one or more demodulation reference signals (DMRS) ports, wherein the association indication is for configuration of uplink (UL) transmissions using a number of UL antenna elements of the UE, and wherein the association field has a bit width determined based on an antenna architecture of the UE, the antenna architecture including the number of UL antenna elements;

determine a DMRS port associated with a PTRS port based on the association indication contained in the association field and the antenna architecture;

determine a Physical Uplink Shared Channel (PUSCH) antenna port associated with the PTRS port based on the antenna architecture of the UE; and transmit to the base station a PTRS through the PUSCH antenna port and the DMRS port associated with the PTRS port.

12. The UE of claim 11, wherein the antenna architecture of the UE further includes a non-coherent antenna architecture, a fully coherent antenna architecture, or a partially coherent antenna architecture including multiple antenna panels.

13. The UE of claim 12, wherein the partially coherent antenna architecture includes:

two antenna panels, each antenna panel including four antenna elements; or four antenna panels, each antenna panel including two antenna elements.

14. The UE of claim 11, wherein the bit width of the association field of the DCI is greater than a number of bits for the association indication.

15. The UE of claim 14, wherein the base station is a first base station, the association indication is a first association indication for the first base station, and the association field of the DCI includes a second association indication to indicate a second association between one or more PTRS ports and one or more DMRS ports for configuration of UL transmissions from the UE to a second base station.

16. The UE of claim 11, wherein the bit width of the association field of the DCI is further determined based on a rank configuration of PUSCH and the antenna architecture including coherency.

17. A non-transitory computer-readable medium storing instructions that, when executed by a processor of a user equipment (UE), cause the UE to perform operations, the operations comprising:

receiving, from a base station, a downlink control information (DCI) including an association indication contained in an association field of the DCI to indicate an association between one or more phase tracking reference signal (PTRS) ports and one or more demodulation reference signals (DMRS) ports, wherein the association indication is for configuration of uplink (UL) transmissions using a number of UL antenna elements of the UE, and wherein the association field has a bit width determined based on an antenna architecture of the UE, the antenna architecture including the number of UL antenna elements;

determining a DMRS port associated with a PTRS port based on the association indication contained in the association field and the antenna architecture;

determining a Physical Uplink Shared Channel (PUSCH) antenna port associated with the PTRS port based on the antenna architecture of the UE; and transmitting to the base station a PTRS through the PUSCH antenna port and the DMRS port associated with the PTRS port.

18. The non-transitory computer-readable medium of claim 17, wherein the antenna architecture of the UE further includes a non-coherent antenna architecture, a fully coherent antenna architecture, or a partially coherent antenna architecture including multiple antenna panels; and wherein the partially coherent antenna architecture includes:

two antenna panels, each antenna panel including four antenna elements; or four antenna panels, each antenna panel including two antenna elements.

* * * * *